Dec. 10, 1957　　　　H. BOUCKE　　　　2,815,748
PULSE RATE INDICATOR
Filed June 16, 1953

INVENTOR
HEINZ BOUCKE
BY
ATTORNEY

United States Patent Office 2,815,748
Patented Dec. 10, 1957

2,815,748
PULSE RATE INDICATOR

Heinz Boucke, Tubingen, Germany, assignor to Radio Patents Company, a partnership Application June 16, 1953, Serial No. 362,009

6 Claims. (Cl. 128—2.05)

The present invention relates to means for and a method of indicating the pulse beat rate or frequency of the human or animal organism by the utilization of an electrical pressure conversion element or transducer applied to a peripheral body member such as a digital or limb pickup point. Such a transducer may be conveniently applied during operations and, among others, has the advantage of enabling a continuous pulse wave recording and/or pulse frequency indication at any desired point remote from the patient.

On the other hand, a peripheral pulse beat wave has the property, especially in the case of younger persons with relatively elastic arteries, that it may contain one or more secondary pulses following the main pulse beat and that especially the first secondary pulse next to the main pulse may have an amplitude differing only slightly from the amplitude of the main pulse. If such an electric pulse wave is utilized to determine the pulse beat rate or frequency, by applying it to a suitable frequency or pulse rate indicator, errors are liable to occur by the indication of a multiple frequency determined by the sum of the main and secondary pulses.

Accordingly, it is an object of the present invention to overcome the aforementioned difficulty by reducing or substantially eliminating the effect of the secondary pulse or pulses of a pulse beat wave, to substantially prevent errors in determining the basic pulse rate or frequency by means of a frequency counter or measuring device.

With the foregoing and further objects in view, as will become more apparent as the following description proceeds, the invention involves generally the provision of an electrical translating system and pulse shaping circuit for converting an arterial pulse or pressure wave into corresponding variations of an electrical current or voltage suitable for direct application to a pulse rate counter or measuring device. For this purpose, the electrical translating system is designed to have a sufficiently low time constant to effect an increased amplitude differential between the main and secondary pulses and to thereby enable a segregation of the main pulse by amplitude selection by means of a suitable amplitude limiter or clipping device.

The invention will be better understood from the following detailed description taken with reference to the accompanying drawing, forming part of this specification and wherein.

Figure 1:
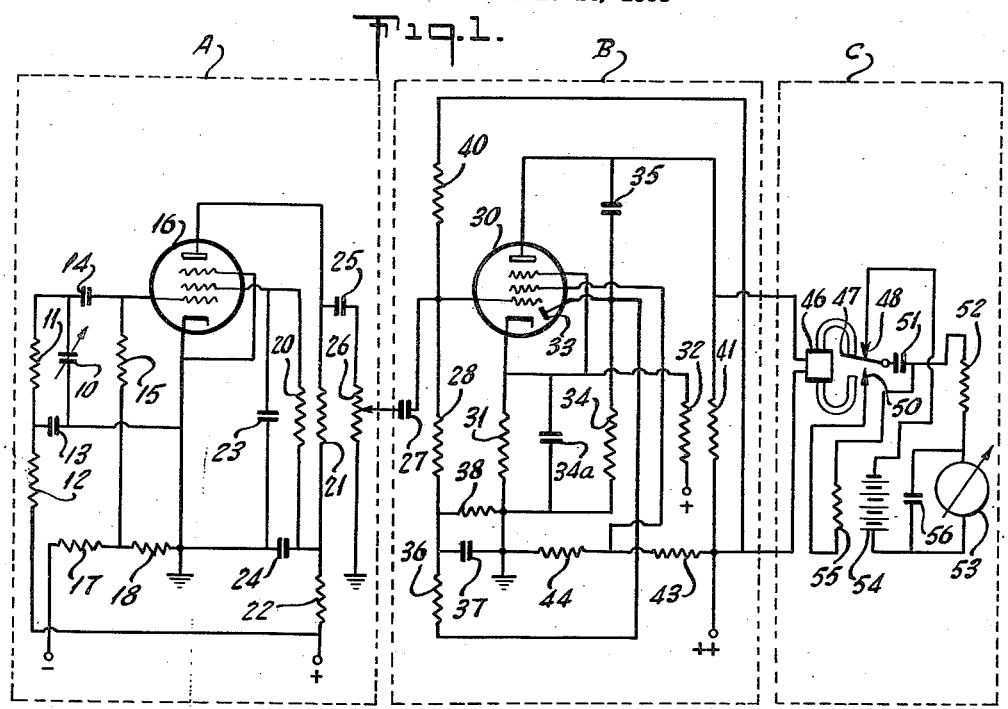
Fig. 1 is a circuit diagram of a pulse rate indicator embodying the principles of the invention and utilizing an electrostatic pressure conversion device as a pulse wave transducer.

The circuit illustrated in the drawing utilizes an electrostatic transducer or pressure conversion element of the special type as described in the present applicant's copending application Serial No. 277,817, filed March 21, 1952, entitled, "Electrostatic Transducer," and now Patent No. 2,755,796 comprising a flat wound electrostatic capacitor applied to a suitable peripheral member of the body such as an arm, wrist, thumb, etc. by means of a cuff, sleeve or other support and serving to convert arterial volume changes or pulse beat fluctuations into proportionate variations of electrical capacitance which are in turn converted into corresponding changes of electric current or potential.

It will be evident from the following that any other type of electrostatic or an equivalent electrical pickup device or transducer capable of converting the pulse pressure variations into corresponding changes of electrical current or potential may be employed for the purpose of the invention.

The circuit shown in Fig. 1 comprises essentially a pre-amplifier A, a clipper amplifier B and a frequency converter or indicator C, both said amplifiers being constructed to act as a pulse shaping circuit or network to convert the initial pulse wave or voltage into a shape more suitable for suppressing the undesirable secondary pulse or pulses by a simple amplitude limiter or clipping device.

The electrostatic pickup device or transducer is schematically shown at 10 and connected between ground and to the positive terminal of an anode current source in series with a pair of resistors 11 and 12. Numeral 13 represents a smoothing or decoupling capacitor connected between the junction of resistors 11 and 12 and ground which is at a potential intermediate between the negative and positive potential of the anode current source indicated by the plus and minus signs in the drawing.

The voltage variations across the transducer 10 developed as a result of the capacitance changes and, in turn, of the pulse pressure variations, are applied by way of a blocking capacitor 14 and grid leak resistance 15 to the input or control grid of a pentode pre-amplifier tube 16 of known construction. The control grid of the tube 16 is biased in a known manner by a negative grid bias voltage derived by way of the grid leak resistance 15 from the junction between a pair of potentiometer resistors 17 and 18 connected in series between ground and the negative terminal of the anode current source. The screen grid of the tube is connected in a known manner to the positive terminal of the anode current source through a voltage drop resistor 20, while the anode of the tube is connected to the same terminal through a load resistor 21, both resistors 20 and 21 being preceded by a further voltage drop or series resistor 22.

A capacitor 23 serves to ground the screen grid with respect to alternating current, while capacitor 24 is a similar grounding or decoupling capacitor by-passing the junction point between the resistors 20 and 21 with resistor 22. A coupling and blocking capacitor 25 connected to the anode of the tube 16 serves to apply the amplified pulse voltage to a variable potentiometer or high ohmic potential divider acting as a volume control for adjusting the sensitivity of the device. The pulse voltage derived from the variable output electrode of the potentiometer 26 is in turn applied by way of a coupling capacitor 27 and a grid leak resistance, comprising a pair of resistors 28 and 38 in series, to the control grid of a clipper amplifier tube or pentode 30.

Figure 2A:
Figs. 2A, 2B, 2C are graphs showing a pulse wave in its various stages of conversion and being explanatory of the function of the invention.

According to the present invention, the design of the circuit is such that the total time constant of the system up to this point determined by the various resistor-capacitor combinations, in particular by the resistors 11, 15, 26 and 28 and the respective series capacitors 10, 14, 25 and 27, has a value of from 0.2 to 0.5 sec. which has been found to result in an elimination of the average or mean amplitude $b$ of the main and secondary pulses in a normal pulse beat wave as shown in Fig. 2A. Referring to the latter, $a$ represents the main pulse followed by a secondary pulse $a'$, both pulses being superimposed upon a base or mean amplitude $b$ decreasing gradually from a maximum to zero. By constructing the circuit or amplifier with a sufficiently low time constant as pointed out, it will act as a high-pass filter with regard to the mean amplitude $b$, in such a manner as to result in the elimination of the latter and the creation of a modified output pulse wave as shown in Fig. 2B and being applied to the grid of the clipper amplifier 30.

Figure 2B:
Figure 2C:
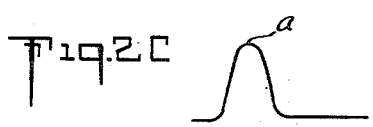

In other words, in Fig. 2B, the base $b$ has been straightened into a substantially straight line $c$, whereby to result in an increased amplitude differential between the main and secondary pulses $a$ and $a'$, respectively. Accordingly, a suitable design of the cut-off point of the clipper amplifier 30 corresponding to the peak amplitude of $a'$ or line $c$ of Fig. 2B, will result in a final single pulse wave $a$ in the output circuit of the tube 30, as shown in Fig. 2C. In other words, the frequency counter or indicator connected in the output of the clipper amplifier will be substantially unaffected by the secondary pulse or pulses, whereby to insure a positive and reliable pulse rate indication.

The clipper amplifier is shown to include an automatic grid bias control to maintain the clipping action at a point coinciding with the peak of the secondary pulse $a'$ irrespective of amplitude variations of the pulse input voltage. In this manner, passage of the secondary pulse or pulses and application to the indicator is avoided under all circumstances, thus causing only the main pulse to be applied to the frequency meter or pulse counter circuit. There are applied for this purpose to the grid of the clipper tube 30 a pair of oppositely poled bias voltages, viz. a negative grid bias voltage supplied by a potential divider comprising a pair of resistors 31 and 32 in series and connected between ground and a suitably intermediate point (single + sign) of an anode current source having a positive terminal indicated by the double + sign, the cathode of the tube being connected to the junction of said resistors to render it positive with respect to ground, this being equivalent to a corresponding negative bias potential on the grid of the tube. To this negative grid bias is added a further negative bias provided by the voltage drop of the steady or average anode current flowing through the cathode resistor 31 shunted by a smoothing capacitor 34a. This same voltage developed across the resistor 31 serves for the further purpose of negatively biasing a diode rectifier embodied in the tube and comprising an auxiliary anode 33 located adjacent to the cathode in a manner well understood. This diode rectifier serves to produce a further variable grid bias voltage proportionate to the average pulse amplitude, the normal negative bias of the diode provided by the voltage drop across resistor 31 being such as to limit the variable bias control to pulse amplitudes exceeding a desired minimum value. Connected to the diode anode 33 is a load resistor 34 returned to the cathode through the smoothing capacitor 34a and cathode resistor 31 in parallel. A coupling capacitor 35 serves to apply a portion of the amplified pulse energy from the anode circuit of the tube to the rectifier circuit, while the rectified control voltage is applied by way of a resistor 36 and by-pass capacitor 37 to the junction of the grid bias resistors 28 and 38.

Since the negative grid bias produced by the voltage drop across the resistor 31 which also serves to bias the diode rectifier is normally greater than required for biasing the tube to its cut-off point, a compensating positive bias is applied to the grid by way of a voltage drop resistor 40 directly from the positive pole of the anode current source. Resistors 43 and 44 constitute a further potential divider connected across the anode current source and serve to provide suitable screen grid potential for the tube, in a manner well understood.

Figure 3A:
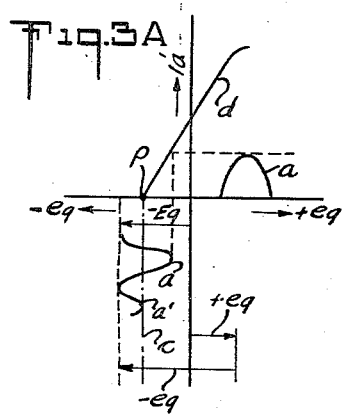
Figs. 3A and 3B are theoretical curves explanatory of the operation of the automatic clipper control embodied in the circuit of Fig. 1.
Figure 3B:
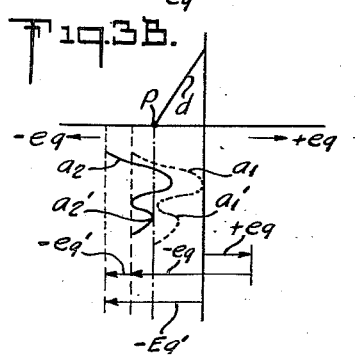

The function and operation of the automatic grid bias control of the clipper tube 30 will be further understood by reference to Figs. 3A and 3B. In the latter, there is shown an idealized tube characteristic $d$ representing anode current $i_a$ as a function of grid voltage $e_g$ and having a negative or anode current cut-off point P. The grid is biased by a fixed bias voltage $+e_g$ directly applied from the anode current source through the resistor 40 and a negative grid bias voltage $-e_g$ provided by the voltage drop through the cathode resistor 31, resulting in a total grid bias $-E_g$ upon which is superimposed the pulse voltage wave, Fig. 2B, comprising the main and secondary pulses $a$ and $a'$, respectively.

The grid bias $E_g$ is so adjusted by the proper control of the bias voltage $+e_g$ and $-e_g$ as to cause the peak or amplitude of the secondary pulse $a'$ or line $c$ to coincide with the cut-off voltage or point P of the tube characteristic. As a result, the secondary pulse or pulses will be suppressed by the clipping or limiting action of the tube, causing only the main pulses $a$ to be transmitted and applied to the frequency counter or indicator.

Assuming now the amplitude of the pulse voltage of Fig. 3A to be increased, to result in main and secondary pulses $a_1$ and $a_1'$ of increased peak values, as shown in Fig. 3B, it will be seen that with the bias voltage $-E_g$ remaining the same, a substantial portion of the secondary pulse $a_1'$ would be passed by the tube and applied to the pulse counter or frequency indicator. On the other hand, by the automatic bias control there is produced an additional negative grid voltage $-e_g'$ by rectification of part of the output pulse voltage, in such a manner as to result in a total negative grid bias $-E_g'$ to again cause the peak $a_2'$ of the secondary pulse to coincide with the shut-off point R and to cause only the main pulse $a_2$ to be passed by the tube. It is seen, therefore, that by the action of the automatic grid bias control, the secondary pulse or pulses will be suppressed under all circumstances by the clipping action of the tube, thus preventing any error or interference with the frequency indication or pulse counting operation.

The pulses $a$, Fig. 2C, occurring in the anode current of the clipper amplifier 30 may be applied to any suitable frequency meter or pulse counting device for directly indicating the pulse beat rate or frequency. There is shown in the drawing by way of example a simple electrical counter circuit comprising a polarized relay 46 having an armature 47 and cooperating contacts 48 and 50. This relay is biased in such a manner as to cause the armature 47 to periodically engage the contacts 48 and 50 in rhythm with the pulses $a$ by connecting the relay winding in the anode circuit of the tube either directly or in parallel to a load resistor 41. As a result, in the position of the armature 47 making contact with the contact 48 as shown, a condenser 51 is charged in series with a resistor 52 and a current indicating instrument 53 by a source of steady voltage such as a battery 54. During the alternate positions of the armature 47 engaging the contact 50, the condenser 51 is discharged through a resistor 55. The charging and discharge resistors 52 and 55 are so designed as to cause a full charge and discharging of the condenser 51 within a fraction of the operating period of the relay armature 47, thus resulting in a series of identical charging pulses through the instrument 53 at a sequence equal to the pulse rate or repetition frequency to be indicated. As a result, the average uni-directional current flowing through the instrument 53 will be directly proportional to the pulse rate or frequency. In order to insure a steady indication, the instrument is shown shunted by a smoothing capacitor 56.

In the foregoing the invention has been described with reference to a specific illustrative device. It will be evident, however, that variations and modifications, as well as the substitution of equivalent elements and circuits for those described for illustration, may be made without departing from the broader scope and spirit of the invention as set forth in the appended claims. Thus, the pulse beat fluctuations may be converted into a corresponding electric current or voltage pulse by means of any known transducer or pickup device, while other known types of electrical pulse rate counters or frequency indicators may be employed for the purposes of this invention. The specification and drawing are accordingly to be regarded in an illustrative rather than in a limiting sense.

I claim:

1. A pulse beat rate indicator comprising transducer means to convert peripheral arterial pulse beat waves into corresponding electric impulses, amplitude limiting means, high pass filter means connecting said amplitude limiting means with said transducer means, said filter means and said amplitude limiting means correlated to substantially suppress secondary pulses following the main pulses and superimposed upon a decreasing means amplitude of said pulse beat waves, and pulse rate indicating means connected to said amplitude limiting means.

2. A pulse beat rate indicator comprising a transducer to convert peripheral arterial pulse beat waves into corresponding electric impulses, a low time-constant resistance-capacity coupled amplifier connected to said transducer and an amplitude limiter having a predetermined cut-off point connected to said amplifier, the time constant of said amplifier correlated with the cut-off point of said limiter to substantially suppress secondary pulses following the main pulses and superimposed upon a decreasing mean amplitude of said heart beat waves, and pulse rate indicating means connected to said limiter.

3. A pulse beat rate indicator comprising a transducer to convert peripheral arterial pulse beat waves into corresponding electric impulses, a clipper amplifier tube having negative grid biasing means to provide a predetermined anode current cut-off point, filter means connecting said transducer with said clipper amplifier, said filter means having a time constant correlated with the bias of said tube, to substantially suppress secondary pulses following the main pulses and superimposed upon a decreasing mean amplitude of said pulse beat waves, and pulse rate indicating means connected to said clipper tube.

4. In a pulse beat rate indicator as claimed in claim 3, automatic bias control means for said clipper tube comprising a rectifier energized by the output pulses of said tube to provide additional negative grid bias potential such as to maintain said cut-off point to substantially coincide with the peak amplitude of the secondary pulses of said pulse beat waves.

5. In a pulse beat rate indicator as claimed in claim 3, automatic bias control means for said clipper tube comprising a rectifier energized by the output pulses of said tube, to provide additional negative grid bias potential such as to cause said cut-off point to substantially coincide with the peak amplitude of the secondary pulses of said pulse beat waves, and further means to apply a fixed bias voltage to said rectifier to limit the automatic bias control to pulse amplitudes exceeding a predetermined minimum level.

6. A pulse beat rate indicator comprising a transducer to convert peripheral arterial pulse beat waves into corresponding electric impulses, a low time-constant resistance-capacity coupled amplifier connected to said transducer and an amplitude limiter having a predetermined cut-off point connected to said amplifier, the time constant of said amplifier correlated with the cut-off point of said limiter to substantially suppress secondary pulses following the main pulses and superimposed upon a decreasing mean amplitude of said pulse beat waves, and a pulse rate counter connected to said limiter comprising a capacitor, means to alternately charge and discharge said capacitor by a fixed charging voltage at the rate of the output pulse frequency of said limiter, and a current indicator in the charging circuit of said capacitor.

References Cited in the file of this patent

UNITED STATES PATENTS

| | | |
|---|---|---|
| 2,273,532 | Lovell | Feb. 17, 1942 |
| 2,406,882 | Young | Sept. 3, 1946 |
| 2,439,495 | Sturm | Apr. 13, 1948 |
| 2,440,278 | Labin et al. | Apr. 27, 1948 |